(12) United States Patent
Lee

(10) Patent No.: US 8,471,887 B2
(45) Date of Patent: Jun. 25, 2013

(54) VIDEO-TELEPHONY TERMINAL AND METHOD FOR CONTROLLING VIDEO-TELEPHONY TERMINAL

(75) Inventor: Doohyoung Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 637 days.

(21) Appl. No.: 12/510,678

(22) Filed: Jul. 28, 2009

(65) Prior Publication Data

US 2010/0123768 A1    May 20, 2010

(30) Foreign Application Priority Data

Nov. 14, 2008  (KR) .......................... 10-2008-0113560
Mar. 13, 2009  (KR) .......................... 10-2009-0021598

(51) Int. Cl.
*H04N 7/14* (2006.01)
(52) U.S. Cl.
USPC ....................................... 348/14.01; 709/204
(58) Field of Classification Search
USPC .. 348/14.01–14.08, 14.09; 709/204; 370/261; 725/21, 36, 95, 118; 455/567
See application file for complete search history.

(56) References Cited

U.S. PATENT DOCUMENTS

| | | | |
|---|---|---|---|
| 7,912,198 B2 * | 3/2011 | Zhang et al. ............. | 379/207.16 |
| 2004/0119814 A1 * | 6/2004 | Clisham et al. ............ | 348/14.08 |
| 2010/0066801 A1 * | 3/2010 | Zhu et al. .................. | 348/14.01 |

* cited by examiner

*Primary Examiner* — Curtis Kuntz
*Assistant Examiner* — Maria El-Zoobi
(74) *Attorney, Agent, or Firm* — H.C. Park & Associates, PLC

(57) ABSTRACT

A video telephony terminal includes a session verification unit to verify whether stuffing data is received from a motion picture ring back tone (RBT) server and a terminating terminal with respect to a request for a video telephony connection, and a communication unit to perform the video telephony connection with the terminating terminal if reception of terminal side stuffing data is verified before reception of server side stuffing data associated with the motion picture RBT server is verified. A method for controlling a video telephony terminal includes performing a video telephony connection with the terminating terminal if terminal side stuffing data is received from the terminating terminal with respect to the request for a video telephony connection before a reception of the server side stuffing data associated with the motion picture RBT server is verified.

17 Claims, 4 Drawing Sheets

VIDEO-TELEPHONY TERMINAL AND METHOD FOR CONTROLLING VIDEO-TELEPHONY TERMINAL

CROSS-REFERENCE TO RELATED APPLICATIONS

This application claims priority from and the benefit of Korean Patent Application No. 10-2008-0113560, filed on Nov. 14, 2008, and Korean Patent Application No. 10-2009-0021598, filed on Mar. 13, 2009, which are both hereby incorporated by reference for all purposes as if fully set forth herein.

BACKGROUND OF THE INVENTION

1. Field of the Invention

Embodiments of the present invention relate to a video telephony terminal and a method for controlling the video telephony terminal.

2. Discussion of the Background

Currently, with the development in communication technologies and diversified user demands, a portable device may provide various types of services, for example, a radio Internet service such as a Wireless Broadband Internet (WiBro), a wideband code division multiple access (WCDMA), a high speed downlink packet access (HSDPA), and the like, and a terrestrial/satellite Digital Multimedia Broadcasting (DMB) service.

In particular, a video call service that permits a user to make a voice call while viewing the face of a counter party via a camera installed in the called device is being developed for use with a $3^{rd}$ generation mobile communication service.

However, unlike the voice call service, the conventional video call service uses quite a bit of time to establish a video call. This is because when the portable device establishes a video call, the portable device may go through a complex message process. Since users are accustomed to a voice call that is established within a relatively short time, for example, two or three seconds, the users may feel it takes a relatively long time to establish the video call, and may be disinclined to use such service.

FIG. 1 is a diagram illustrating a message processing process when performing a video telephony connection according to a conventional art.

As shown in FIG. 1, when an originating terminal ($MS_O$) transmits a setup message (Setup ITU-UDI) to an originating mobile switching center ($MSC_O$) to make a video telephony with a terminating terminal ($MS_T$), the $MSC_O$ may transmit a call processing to the $MS_O$ and then establish the video telephony with the $MS_T$ via a terminating home location register ($HLR_T$) and a terminating MSC ($MSC_T$). The $MSC_T$ may control a motion picture ring back tone (RBT) server (3G IP) to transmit a multimedia coloring to the originating terminal $MS_O$ according to a media access scheme, that is, H.245.

While the motion picture RBT server (3G IP) transmits the multimedia coloring to the $MS_O$, the $MSC_T$ may inform the $MS_T$ that the $MS_O$ is attempting a video telephony call, and thereby controls a video telephony to be connected between the $MS_O$ and the $MS_T$.

As described above, in the conventional art, when connecting a video telephony between an originating terminal $MS_O$ and a terminating terminal $MS_T$, the originating terminal $MS_O$ and the terminating terminal $MS_T$ may go through a complex message processing process. This may require a long time to establish the video call in comparison to a voice call.

Referring again to FIG. 1, in the conventional video call service, when the motion picture RBT server 3G IP exists as shown in FIG. 1, the originating terminal $MS_O$ may perform a primary H.245 negotiation with the motion picture RBT server 3G IP to thereby receive, from the motion picture RBT server 3G IP, the multimedia coloring according to the media access (H.245). The originating terminal $MS_O$ may perform a secondary H.245 negotiation with the terminating terminal $MS_T$ to thereby initiate the video telephony with the terminating terminal $MS_T$.

If the motion picture RBT server 3G IP has an error, however, such as overload and the like, an H.223 level detection may fail while performing the primary H.245 negotiation with the motion picture RBT server 3G IP. Thus, the video call may be terminated. Specifically, if an error occurs in the motion picture RBT server 3G IP, the video telephony with the terminating terminal $MS_T$ may not be performed.

Accordingly, there is a need for a technology that may process a secondary video telephony negotiation with a terminating terminal $MS_T$ even if an originating terminal $MS_O$ performing a primary video telephony negotiation does not successfully perform the primary H.245 negotiation with the motion picture RBT server 3G IP.

SUMMARY OF THE INVENTION

Exemplary embodiments of the present invention provide a video telephony terminal that may process a video telephony connection with a terminating terminal if access to a motion picture RBT server fails with respect to a request for the video telephony connection, and a method for controlling the video telephony terminal.

Exemplary embodiments of the present invention also provide a video telephony terminal that may perform a terminating terminal call request to a terminating terminal if a connection to a motion picture RBT server is not performed, and a method for controlling the video telephony terminal.

Exemplary embodiments of the present invention also provide a video telephony terminal that may perform a video telephony connection with a terminating terminal using stuffing data, received from the terminating terminal, without terminating a video call even if a primary H.223 level detection for performing a connection with a motion picture RBT server fails, and a method for controlling the video telephony terminal.

Additional features of the invention will be set forth in the description which follows, and in part will be apparent from the description, or may be learned by practice of the invention.

An exemplary embodiment of the present invention discloses a video telephony terminal including a session verification unit to verify whether server side stuffing data is received from a motion picture RBT server with respect to a request for a video telephony connection, and to verify whether terminal side stuffing data is received from a terminating terminal with respect to the request for a video telephony connection, and a communication unit to perform the video telephony connection with the terminating terminal if a reception of the terminal side stuffing data associated with the terminating terminal is verified before a reception of the server side stuffing data associated with the motion picture RBT server is verified.

An exemplary embodiment of the present invention discloses a method for controlling a video telephony terminal, including verifying whether server side stuffing data is received from a motion picture ring back tone (RBT) server with respect to a request for a video telephony connection, and verifying whether terminal side stuffing data is received from a terminating terminal with respect to the request for a video telephony connection, and performing the video telephony connection with the terminating terminal if a reception of the terminal side stuffing data associated with the terminating terminal is verified before a reception of the server side stuffing data associated with the motion picture RBT server is verified.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
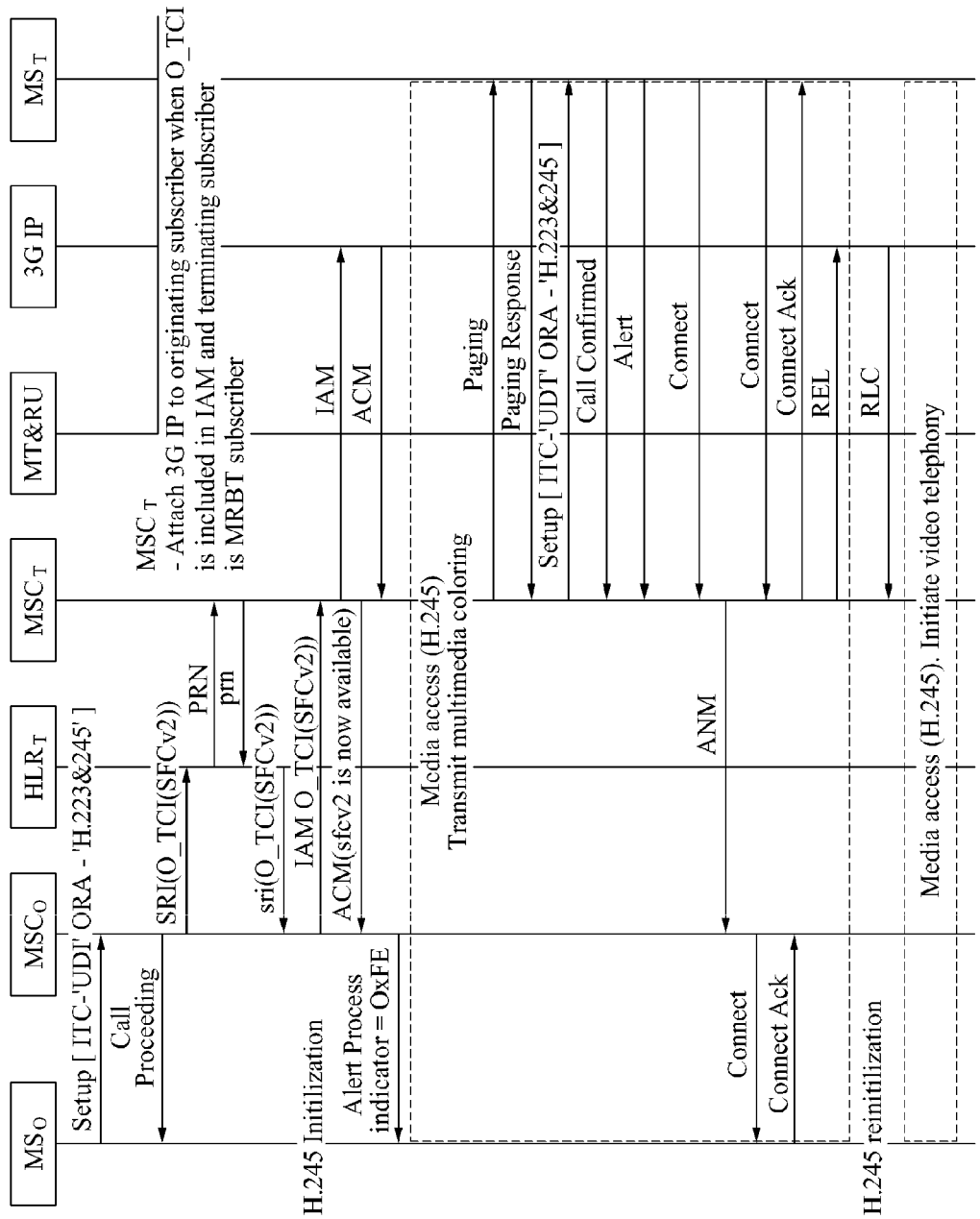
FIG. 1 is a diagram illustrating a message processing process when performing a video telephony connection according to a conventional art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. If an element is referred to as being "connected to" another element, it can be directly connected to the other element, or intervening elements may be present.

A video telephony terminal satisfying an H.324M standard according to an embodiment of the present invention could be any type of portable device, for example, a notebook computer, a cellular phone, a personal communication service (PCS) phone, a satellite/terrestrial Digital Multimedia Broadcasting (DMB) phone, a personal digital assistant (PDA), a portable multimedia player (PMP), an MP3 player, and the like.

Figure 2:
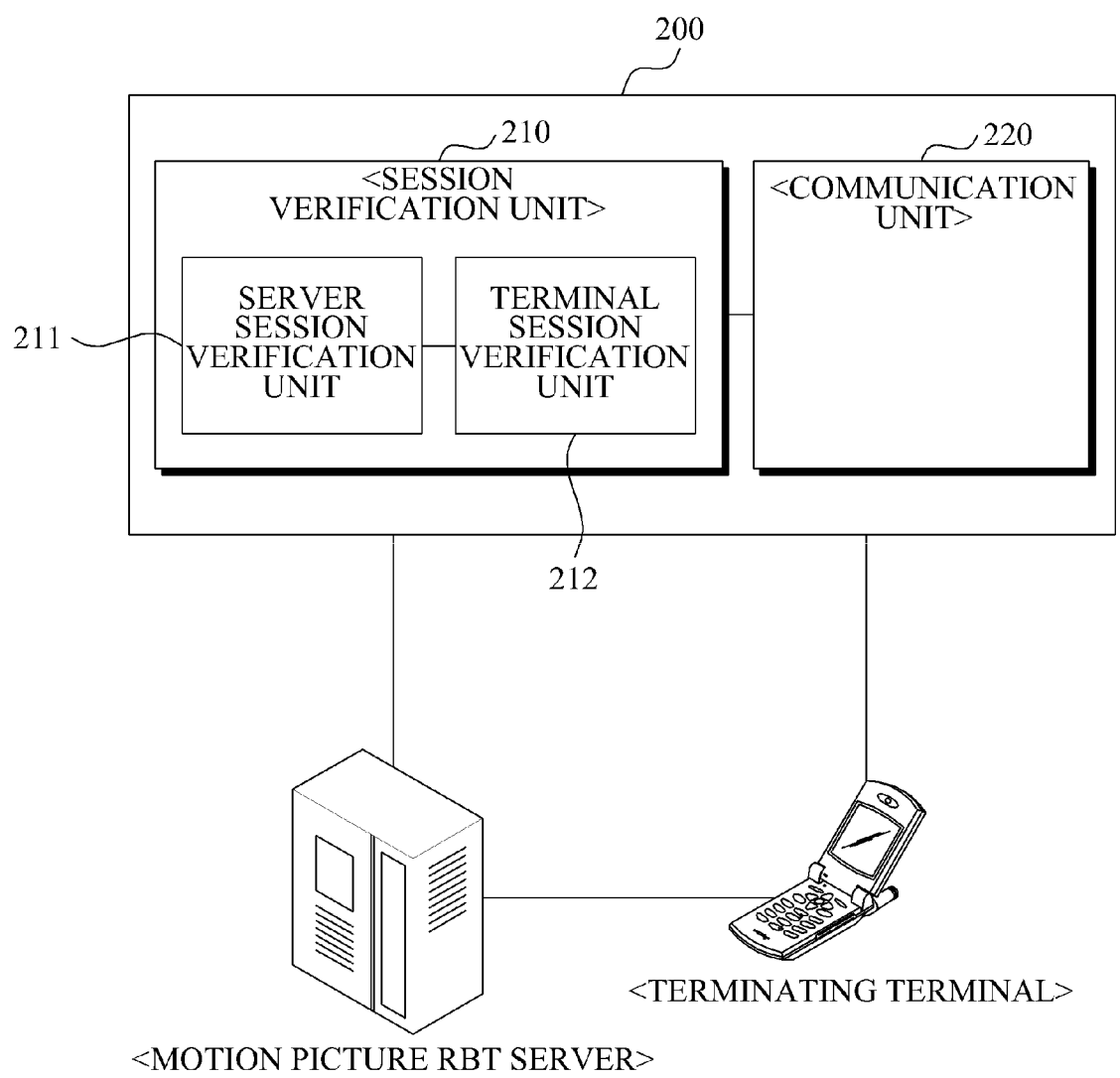
FIG. 2 is a block diagram illustrating a configuration of a video telephony terminal according to an exemplary embodiment of the present invention.

FIG. 2 is a block diagram illustrating a configuration of a video telephony terminal according to an exemplary embodiment of the present invention.

As shown in FIG. 2, the video telephony terminal 200 may include a session verification unit 210 and a communication unit 220. The video telephony terminal 200 will be described in more detail as an originating terminal that requests a video telephony call with a terminating terminal. The session verification unit 210 may verify whether stuffing data is received from a motion picture ring back tone (RBT) server and a terminating terminal with respect to a request for a video telephony connection. When a reception of terminal side stuffing data associated with the terminating terminal is verified before reception of server side stuffing data associated with the motion picture RBT server is verified, the communication unit 220 may perform the video telephony connection with the terminating terminal as a response to the request for the video telephony connection.

Here, the stuffing data denotes a connection message that is received from the motion picture RBT server and/or the terminating terminal in response to the request for the video telephony connection, and may be configured as, for example, "E1 4D 00 00 00".

The session verification unit 210 may include a server session verification unit 211 and a terminal session verification unit 212.

The server session verification unit 211 may verify whether the server side stuffing data is received, within a first time interval, via a server session with the motion picture RBT server that is set according to the request for the video telephony connection.

The terminal session verification unit 212 may verify whether the terminal side stuffing data is received, within a second time interval, via a terminal session with the terminating terminal that is set according to the request for the video telephony connection.

Here, the first time interval and the second time interval may be set based on the request for the video telephony connection. The second time interval may be set to be greater than the first time interval. For example, when the first time interval is set to 10 seconds, the second time interval may be set to 60 seconds. The second time interval may start at the same time as the first time interval, or may start after a preset delay after the first time interval begins.

For example, the server session verification unit 211 may monitor whether the server side stuffing data is received, via the server session, from the motion picture RBT server within 10 seconds based on the request for the video telephony connection. Similarly, the terminal session verification 212 may monitor whether the terminal side stuffing data is received, via the terminal session, from the terminating terminal within 60 seconds based on the request for the video telephony connection.

If the reception of the terminal side stuffing data associated with the terminating terminal is verified before the reception of the server side stuffing data associated with the motion picture RBT server is verified, the communication unit 200 may perform the video telephony connection with the terminating terminal as the response to the request for the video telephony connection. This delay in receipt of the server side stuffing data may be due to an error of the motion picture RBT server, for example, signal distortion, a signal delay, and the like, and the communication unit 200 may still perform the video telephony connection with the terminating terminal.

Thus, if the server side stuffing data is not received within the first time interval, but the terminal side stuffing data is received within the second time interval, the communication unit 200 may validate the request for the video telephony connection. Similarly, if the server side stuffing data is received after the terminal side stuffing data is received within the second time interval, the communication unit 200 may validate the request for the video telephony connection. Therefore, the communication unit 200 may perform the video telephony connection with the terminating terminal to initiate a video telephony.

Specifically, if the server session verification unit 211 verifies that the server side stuffing data is not received via the server session within the first time interval, the communication unit 200 may release the server session but may delay invalidating the request for the video telephony connection. More specifically, if the server side stuffing data is not received within the first time interval, the communication unit 200 may verify whether the terminal side stuffing data is received from the terminating terminal within the second time interval using the terminal session verification unit 212, instead of immediately terminating the request for the video telephony connection upon expiration of the first time interval.

If the terminal side stuffing data is received via the terminal session within the second time interval, the communication unit 200 may validate the request for the video telephony connection, even if the server side stuffing data is not received within the first time interval.

Also, if the reception of the terminal side stuffing data is verified by the terminal session verification unit 212 within the second time interval, the communicant unit 200 may perform the video telephony connection via the terminal session.

Conversely, if the terminal side stuffing data is not received via the terminal session within the second time interval, the communication unit 200 may invalidate the request for the video telephony connection and release the terminal session.

Specifically, if the terminal session verification unit 212 verifies that the terminal side stuffing data is not received within the second time interval, the communication unit 200 may determine there is no response from the terminating terminal with respect to the request for the video telephony connection, and thereby terminate the request for the video telephony connection.

For example, if reception of the server side stuffing data is verified before the reception of the terminal side stuffing data is verified, the communication unit 200 may receive RBT data from the motion picture RBT server via the server session. As the terminal side stuffing data is received and receipt is verified, the communication unit 200 may release the server session.

Specifically, if the server session verification unit 211 verifies that the server side stuffing data is received via the server session within the first time interval, the communication unit 200 may receive RBT data such as a video coloring from the motion picture RBT server via the server session. While receiving the RBT data, the terminal session verification unit 212 may verify that the terminal side stuffing data is received. In this case, the communication unit 200 may release the server session to thereby terminate receiving the RBT data, and may perform the video telephony connection with the terminating terminal via the terminal session set according to the request for the video telephony connection.

The server session and the terminal session may be set to satisfy an H.324M standard. The video telephony terminal satisfying the H.324M standard may access a telephone network via a currently standardized V.34 modem or a dedicated telephone modem at a highest transmission rate of 28.8 kbps. Compression of a motion picture may use an H.263 standard corresponding to an enhanced H.261 standard. Compression of a voice may use G723, which is a code excited linear prediction (CELP) scheme.

As described above, even if access to a motion picture RBT server fails with respect to a request for a video telephony connection, it is possible to process the video telephony connection with a terminating terminal.

Also, a video telephony terminal may perform a terminating terminal call request even if a connection to a motion picture RBT server fails, and thereby may satisfy an H.324M standard.

Also, if a primary H.223 level detection for performing a connection with a motion picture RBT server fails, it is still possible to perform a video telephony connection with a terminating terminal using stuffing data, for example, E1 4D 00 00 00, received from the terminating terminal without terminating the video call.

Figure 3:
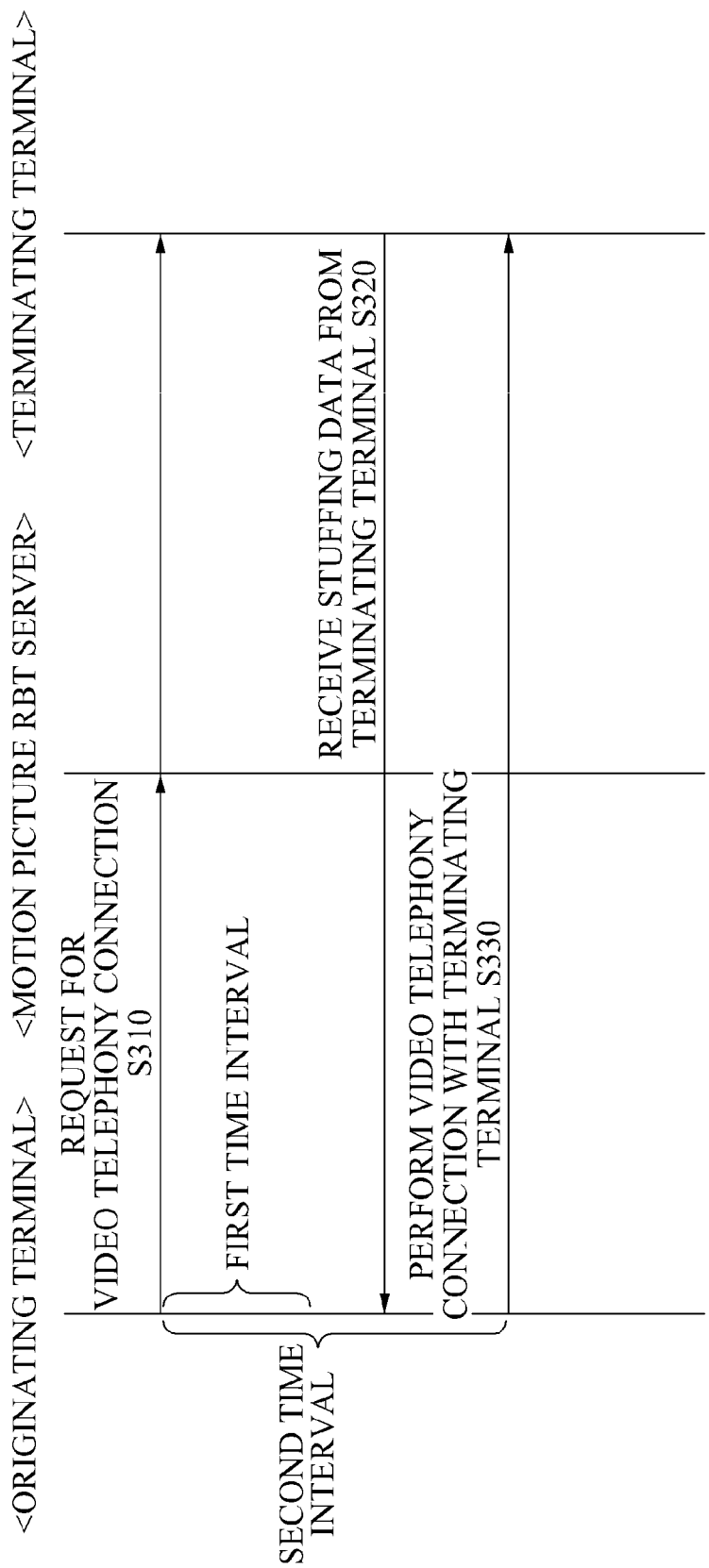
FIG. 3 is a flowchart illustrating a method for controlling a video telephony terminal according to an exemplary embodiment of the present invention.

FIG. 3 is a flowchart illustrating a method for controlling a video telephony terminal according to an exemplary embodiment of the present invention.

The method for controlling the video telephony terminal may be performed by the video telephony terminal 200 of FIG. 2 according to an embodiment of the present invention, but is not limited hereto. For ease of description, the method of FIG. 3 will be described with reference to the video telephony terminal 200 shown in FIG. 2. An originating terminal of FIG. 3 will refer to the video telephony terminal 200.

In operation S310, the originating terminal may request a video telephony connection with a terminating terminal via a motion picture RBT server.

Then, during a first time interval, the server session verification unit 211 may verify whether the server side stuffing data is received via a server session set with the motion picture RBT server according to the request for the video telephony connection. The terminal session verification unit 212 may verify whether the terminal side stuffing data is received, within a second time interval that may at least partially overlap with the first time interval, via a terminal session set with the terminating terminal set according to the request for the video telephony connection.

As described above, the first time interval and the second time interval may be set based on the request for the video telephony connection. The second time interval may be greater than the first time interval. For example, if the first time interval is 10 seconds, the second time interval may be 60 seconds.

Also, the server session and the terminal session may be set to satisfy an H.324M standard. The video telephony terminal satisfying the H.324M standard may access a telephone network via a currently standardized V.34 modem or a dedicated telephone modem as a highest speed of 28.8 kbps. Compression of a motion picture may use an H.263 standard corresponding to an enhanced H.261 standard. Compression of a voice may use G723, which is a CELP scheme.

For example, the server session verification unit 211 may monitor whether the server side stuffing data is received, via the server session, from the motion picture RBT server within 10 seconds based on the request for the video telephony connection. Similarly, the terminal session verification 212 may monitor whether the terminal side stuffing data is received, via the terminal session, from the terminating terminal within 60 seconds based on the request for the video telephony connection.

In operation S320, if the server side stuffing data is not received via the server session within the first time interval but the terminal side stuffing data is received from the terminating terminal within the second time interval, the video telephony terminal 200 may release the server session and validate the request for the video telephony connection.

In operation S330, the video telephony terminal 200 may perform the video telephony connection with the terminating terminal via the terminal session with the terminating terminal.

As described above, according to an exemplary embodiment of the present invention, even if an access to a motion picture RBT server fails with respect to a request for a video telephony connection, it is still possible to process the video telephony connection with a terminating terminal.

Figure 4:
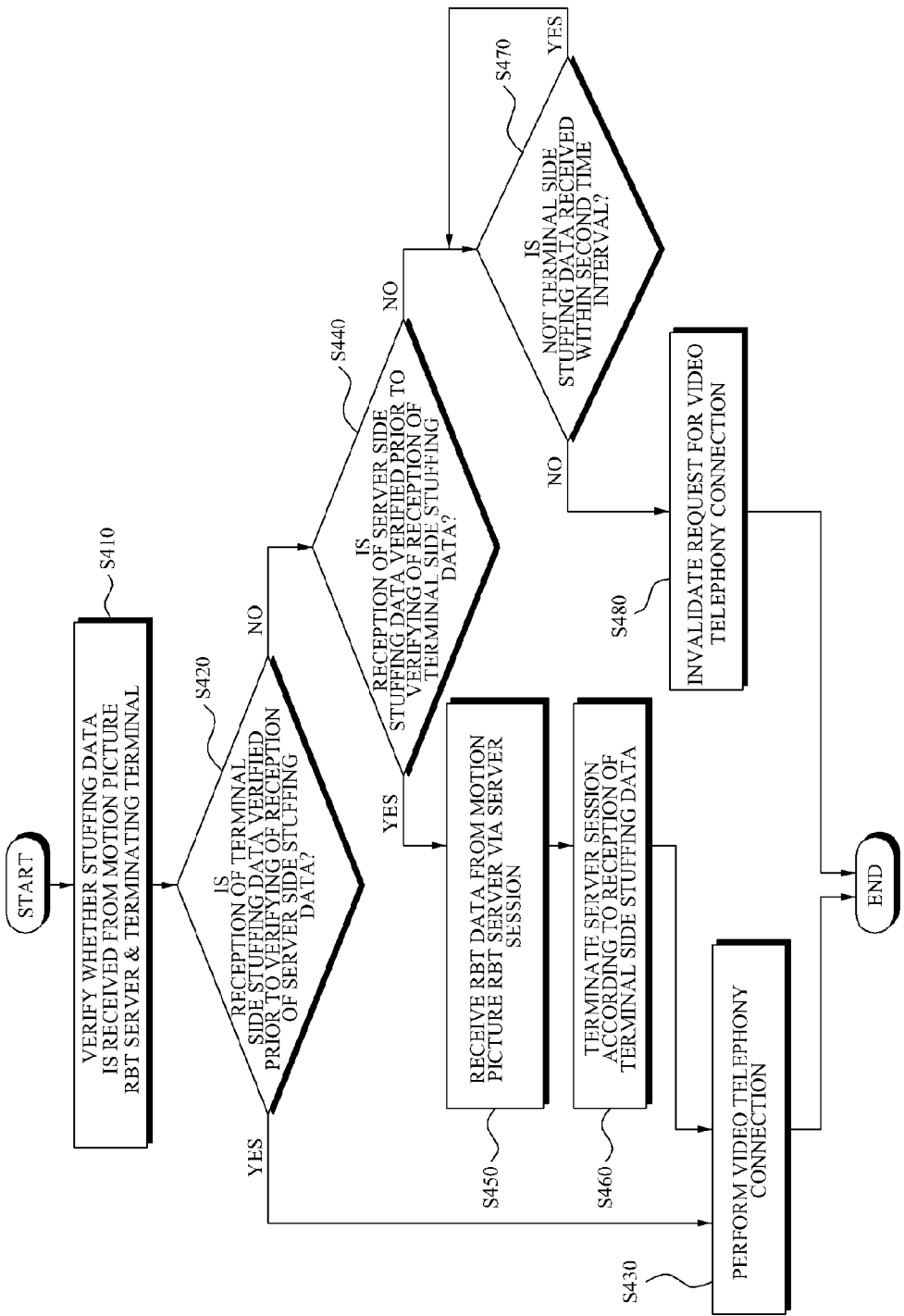
FIG. 4 is a flowchart illustrating a method for controlling a video telephony terminal according to an exemplary embodiment of the present invention.

FIG. 4 is a flowchart illustrating a method for controlling a video telephony terminal according to an exemplary embodiment of the present invention.

The method shown in FIG. 4 may be performed by the video telephony terminal 200 of FIG. 2 according to an exemplary embodiment of the present invention, but is not limited hereto. For ease of description, the video method of FIG. 4 will be described with reference to FIG. 2.

In operation S410, the video telephony terminal 200 having requested a video telephony connection may verify whether stuffing data is received from a motion picture RBT server and a terminating terminal corresponding to the request for a video telephony connection.

Here, the stuffing data denotes a connection message that is received from the motion picture RBT server and/or the terminating terminal in response to the request for the video telephony connection, and may be configured as, for example, "E1 4D 00 00 00".

The server session verification unit 211 may verify whether the server side stuffing data is received within a first time interval, for example, 10 seconds, via a server session with the motion picture RBT server that is set according to the request for the video telephony connection. Also, the terminal session verification unit 212 may verify whether the terminal side stuffing data is received within a second time interval, for example, 60 seconds, via a terminal session with the terminating terminal that is set according to the request for the video telephony connection.

In operation S420, the video telephony terminal 200 determines whether a reception of terminal side stuffing data associated with the terminating terminal is verified before a reception of server side stuffing data associated with the motion picture RBT server is verified.

If the server side stuffing data is not received within the first time interval and the terminal side stuffing data is received within the second time interval in operation S420, the video telephony terminal 200 may release the server session and validate the request for the video telephony connection to perform the video telephony connection with the terminating terminal via the terminal session in operation S430.

Conversely, if the server side stuffing data is received within the first time interval, or the terminal side stuffing data is not received within the second time interval in operation S420, the video telephony terminal 200 in operation S440 may verify whether the reception of the server side stuffing data is verified before the reception of the terminal side stuffing data is verified.

If the server side stuffing data is received within the first time interval and verified before reception of the terminal side stuffing data is verified in operation S440, the video telephony terminal 200 may receive, from the motion picture RBT server, RBT data such as a video coloring via the server session in operation S450.

If the terminal side stuffing data is received and verified while receiving the RBT data, the video telephony terminal 200 may release the server session to thereby terminate receiving of the RBT data in operation S460. Then, in operation S430, the video telephony terminal 200 may perform the video telephony connection with the terminating terminal via the terminal session with the terminating terminal.

Conversely, if the server side stuffing data is not received within the first time interval, the video telephony terminal 200 may proceed from operation S440 and determine whether the terminal side stuffing data is received within the second time interval in operation S470.

If the terminal side stuffing data is not received in operation S470, the video telephony terminal may invalidate the request for the video telephony connection in operation S480. Specifically, the video telephony terminal 200 may determine there is no response from the terminating terminal with respect to the request for the video telephony connection and thereby terminate the request for the video telephony connection.

To the contrary, if the terminal side stuffing data is received within the second time interval in operation S470, the video telephony terminal 200 may perform the video telephony connection with the terminating terminal via the terminal session with the terminating terminal in operation S430.

The method for controlling the video telephony terminal according to the above-described exemplary embodiments may be recorded in computer-readable media including program instructions to implement various operations when executed by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to exemplary embodiments of the present invention, if access to a motion picture RBT server fails with respect to a request for a video telephony connection, the video telephony connection with a terminating terminal may still be processed.

Also, a video telephony terminal may perform a terminating terminal call request to a terminating terminal even if a connection to a motion picture RBT server is not performed.

Also, if a primary H.223 level detection for performing a connection with a motion picture RBT server fails, it is possible to perform a video telephony connection with a terminating terminal using stuffing data, for example, E1 4D 00 00 00, received from the terminating terminal, without terminating a video call.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A video telephony terminal, comprising:
a session verification unit to verify whether server side stuffing data is received from a motion picture ring back tone (RBT) server with respect to a request for a video telephony connection, and to verify whether terminal side stuffing data is received from a terminating terminal with respect to the request for a video telephony connection; and a communication unit to perform the video telephony connection with the terminating terminal if a reception of the terminal side stuffing data associated with the terminating terminal is verified before a reception of the server side stuffing data associated with the motion picture RBT server is verified, wherein the server side stuffing data comprises a connection message received from the motion picture RBT server in response to the request for the video telephony connection, and the terminal side stuffing data comprises a connection message received from the terminating terminal in response to the request for the video telephony connection.

2. The video telephony terminal of claim 1, wherein if the server side stuffing data is not received within a first time interval and the terminal side stuffing data is received within a second time interval, the communication unit performs the video telephony connection with the terminating terminal.

3. The video telephony terminal of claim 2, wherein the first time interval is shorter than the second time interval.

4. The video telephony terminal of claim 2, wherein the second time interval at least partially overlaps with the first time interval.

5. The video telephony terminal of claim 1, wherein the session verification unit comprises:
a server session verification unit to verify whether the server side stuffing data is received via a server session with the motion picture RBT server; and
a terminal session verification unit to verify whether the terminal side stuffing data is received via a terminal session with the terminating terminal.

6. The video telephony terminal of claim 5, wherein:
if the server session verification unit verifies that the server side stuffing data is not received, the communication unit releases the server session, and
if the terminal session verification unit verifies that the terminal side stuffing data is received, the communication unit performs the video telephony connection with the terminal session.

7. The video telephony terminal of claim 5, wherein if the terminal session verification unit verifies that the terminal side stuffing data is not received, the communication unit invalidates the request for the video telephony connection.

8. The video telephony terminal of claim 1, wherein:
if the reception of the server side stuffing data is verified before the reception of the terminal side stuffing data is verified, the communication unit receives RBT data from the motion picture RBT server via a server session with the motion picture RBT server that is set according to the request for the video telephony connection, and
if the terminal side stuffing data is received while the communication unit receives RBT data from the motion picture RBT server, the communication unit releases the server session.

9. A method for controlling a video telephony terminal, comprising:
verifying whether server side stuffing data is received from a motion picture ring back tone (RBT) server with respect to a request for a video telephony connection, and verifying whether terminal side stuffing data is received from a terminating terminal with respect to the request for a video telephony connection; and
performing the video telephony connection with the terminating terminal if a reception of the terminal side stuffing data associated with the terminating terminal is verified before a reception of the server side stuffing data associated with the motion picture RBT server is verified,
wherein the server side stuffing data comprises a connection message received from the motion picture RBT server in response to the request for the video telephony connection, and the terminal side stuffing data comprises a connection message received from the terminating terminal in response to the request for the video telephony connection.

10. The method of claim 9, wherein if the server side stuffing data is not received within a first time interval and the terminal side stuffing data is received within a second time, the video telephony connection is performed with the terminating terminal.

11. The method of claim 10, wherein the first time interval is shorter than the second time interval.

12. The method of claim 10, wherein the second time interval at least partially overlaps with the first time interval.

13. The method of claim 9, wherein the verifying comprises:
verifying whether the server side stuffing data is received via a server session with the motion picture RBT server; and
verifying whether the terminal side stuffing data is received via a terminal session with the terminating terminal.

14. The method of claim 13, further comprising:
releasing the server session if the server side stuffing data is not received; and
performing the video telephony connection via the terminal session if the terminal side stuffing data is received.

15. The method of claim 9, further comprising:
invalidating the request for the video telephony connection if the terminal side stuffing data is not received.

16. The method of claim 9, further comprising:
receiving RBT data from the motion picture RBT server via a server session with the motion picture RBT server that is set according to the request for the video telephony connection if the reception of the server side stuffing data is verified before the reception of the terminal side stuffing data is verified; and
releasing the server session if the terminal side stuffing data is received while receiving the RBT data from the motion picture RBT server.

17. A computer comprising a processor and a non-transitory computer-readable storage medium comprising a program, when executed, to perform the method of claim 9.

* * * * *